US008656483B2

(12) United States Patent
Ma

(10) Patent No.: US 8,656,483 B2
(45) Date of Patent: Feb. 18, 2014

(54) SYSTEM FOR LOCKING ELECTRONIC DEVICE AND METHOD THEREOF

(75) Inventor: Xian-Wei Ma, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 398 days.

(21) Appl. No.: 12/694,182

(22) Filed: Jan. 26, 2010

(65) Prior Publication Data

US 2011/0019818 A1    Jan. 27, 2011

(30) Foreign Application Priority Data

Jul. 23, 2009 (CN) .......................... 2009 1 0304722

(51) Int. Cl.
*G06F 21/00* (2013.01)
(52) U.S. Cl.
USPC ................................................ 726/16; 726/2
(58) Field of Classification Search
None
See application file for complete search history.

(56) References Cited

U.S. PATENT DOCUMENTS

| 3,775,562 | A | * | 11/1973 | Crimmins et al. | ............... | 380/34 |
| 3,944,745 | A | * | 3/1976 | Gannett | ........................... | 380/41 |
| 2004/0061597 | A1 | * | 4/2004 | Thompson | ............... | 340/426.28 |
| 2005/0156318 | A1 | * | 7/2005 | Douglas | ........................ | 257/761 |
| 2009/0293562 | A1 | * | 12/2009 | Fisher et al. | ................. | 70/278.7 |
| 2011/0067254 | A1 | * | 3/2011 | Randall | ........................... | 33/540 |

OTHER PUBLICATIONS

Definitions of "Encryption Key" and "Encryption", Microsoft Press Computer Dictionary, 3rd. ed, 1997, p. 175.*

* cited by examiner

*Primary Examiner* — Jeffery Williams
(74) *Attorney, Agent, or Firm* — Altis Law Group, Inc.

(57) ABSTRACT

A system for locking an electronic device is provided. The system includes an electronic device, and electronic keys electrically connected to the electronic device. The electronic key includes a plurality of resistors which are connected in series, the resistance value of the electronic key is changeable by coupling different resistors of the electronic key. The electronic device comprises of a processing unit and a function key. When the function key produces locking command in response to user operation, the processing unit obtains the resistance value of the electronic key and produce encryption key according to the obtained resistance value to unlock the electronic device. When the function key produces unlocking command, the processing unit decodes the encryption key and unlocks the electronic device when determining the obtained value matches the decoded encryption key.

9 Claims, 6 Drawing Sheets

SYSTEM FOR LOCKING ELECTRONIC DEVICE AND METHOD THEREOF

BACKGROUND

1. Technical Field

The disclosure relates to electronic devices and, particularly, to a system for locking and unlocking an electronic device.

2. Description of Related Art

Nowadays, electronic devices such as mobile phones have become more and popular. To prevent unauthorized use of the device, the owner can set a password to lock or unlock the device.

To set a password one must input characters using a keyboard which is not always the convenient way to the owner. Therefore, there is a need for a new method and system to lock and unlock the electronic device.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION

Figure 1:
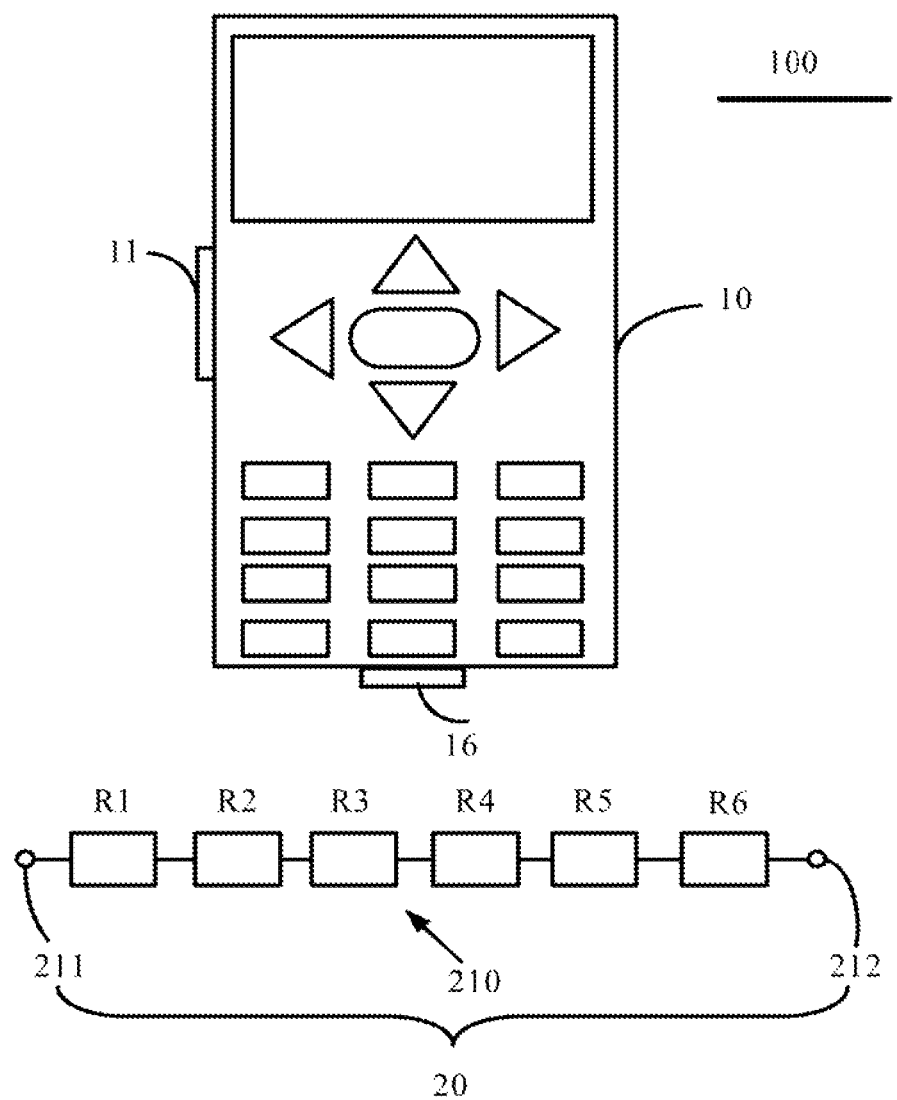
FIG. 1 is a block diagram of a system for locking and unlocking an electronic device in accordance with an exemplary embodiment.
Figure 2:
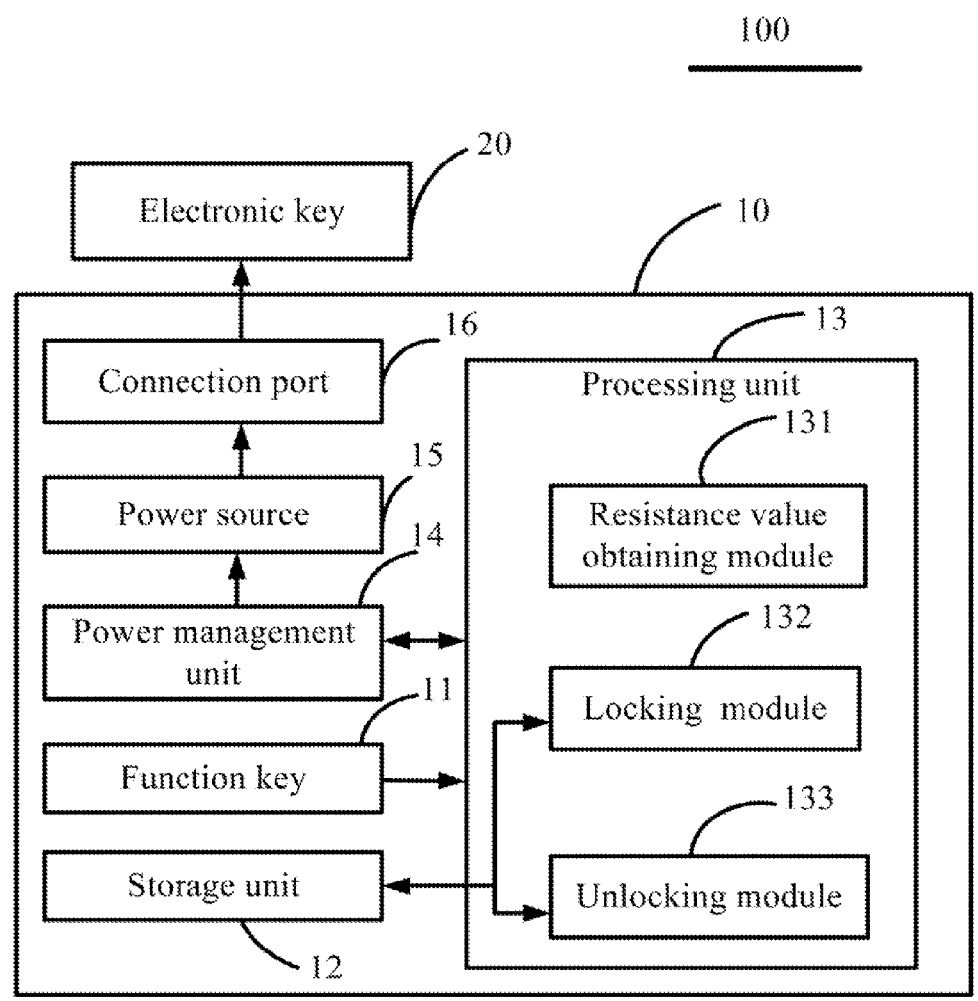
FIG. 2 is a functional block diagram of the system of FIG. 1.

Referring to FIGS. 1 and 2, a system 100 for locking an electronic device (hereinafter: system 100) includes the electronic device 10 and an electronic key 20.

The electronic key 20 includes a resistive circuit 210. As shown in FIG. 1, in the embodiment, the circuit 210 includes six resistors R1, R2, R3, R4, R5, and R6. However, it should be noted that the number of the resistors in the resistive circuit 210 is not limited to as in this embodiment, and can be any number greater than 1, as needed. The resistors R1~R6 can have the same resistance value or different resistance values. The electronic device 10 includes a connection port 16, which is configured to connect to the electronic key 20. The electronic device 10 also includes a function key 11, which is used for producing a locking or an unlocking command in response to user operations, the function key 11 could be configured at any suitable place of the electronic device 10, for example, a left side or a right side of the electronic device 10.

Referring also to FIG. 2, the electronic device 10 includes the function key 11, a storage unit 12, a processing unit 13, a power management unit 14, a power source and the connection port 16. The processing unit 13 is connected to the function key 11, the storage unit 12, and the power management unit 14.

The processing unit 13 includes a resistance value obtaining module 131, an locking module 132, and a unlocking module 133. The resistance value obtaining module 131 is used for obtaining the resistance value of the electronic key 20. The locking module 132 is used for encoding the resistance value of the electronic key 20 to produce an encryption key for the electronic device 10 and storing the encryption key in the storage unit 12 when the function key 11 produces a locking command. In other embodiments, the locking module 132 also prompts the user to input the resistance value again, ensuring the user has set the correct and desired resistance value. The unlocking module 132 is used for unlocking the electronic device 10. In detail, the unlocking module 132 decodes the encryption key stored in the storage unit 12 and compares the decoded encryption key with the resistance value obtained by the resistance value obtaining module 131. The electronic device 10 is unlocked when the resistance value obtained by the resistance value obtaining module 131 matches the decoded encryption key. In present invention, the term "encryption key" is a value produced by encoding the resistance value of the electronic key 20, and is used to compare with the resistance value obtained by the resistance value obtaining module after being decoded, in the process of unlocking the electronic device 10.

Figure 3:
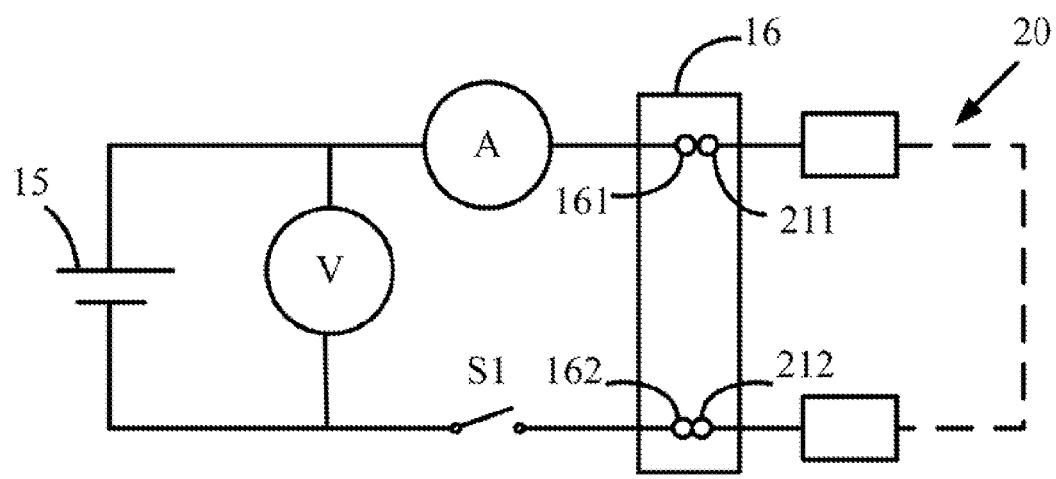
FIG. 3 is a circuit diagram illustrating the connection of a series of resistors and the electronic device of the system of FIG. 1.

Referring to FIG. 3, in the embodiment, the connection port 16 includes two terminals 161, 162, and two ends 211, 212 of the electronic key 20 these are electronically connected to the power source 15 of the electronic device 10 to the connection port 16 thus forming a circuit. Furthermore, a switch S1 is connected between the power source 15 and the terminal 162 of the connection port 16, an ammeter A is connected between the power source 15 and the terminal 161 of the connection port 16, and a voltmeter V and the electronic key 20 are connected in parallel between the two terminals 161, 162 of connection port 16. The switch S1 is connected to the power management unit 14, the processing unit 13 controls the power management unit 14 to switch on switch S1 when receiving the locking command from the function key 11, then the electronic key 20 is activated and the power source 15 provides power to the electronic key 20.

The ammeter A obtains the current I of the electronic key 20 and the voltmeter V obtains the voltage U of the electronic key 20. The resistance value obtaining module 131 calculates the resistance value of the electronic key 20 using the formula: $R=U/I$. In the embodiment, the locking module 132 of the processing unit 13 is also used for controlling the power management unit 14 to switch off the switch S1 after locking the electronic device 10, the electronic key 20 is then deactivated.

Figure 4:
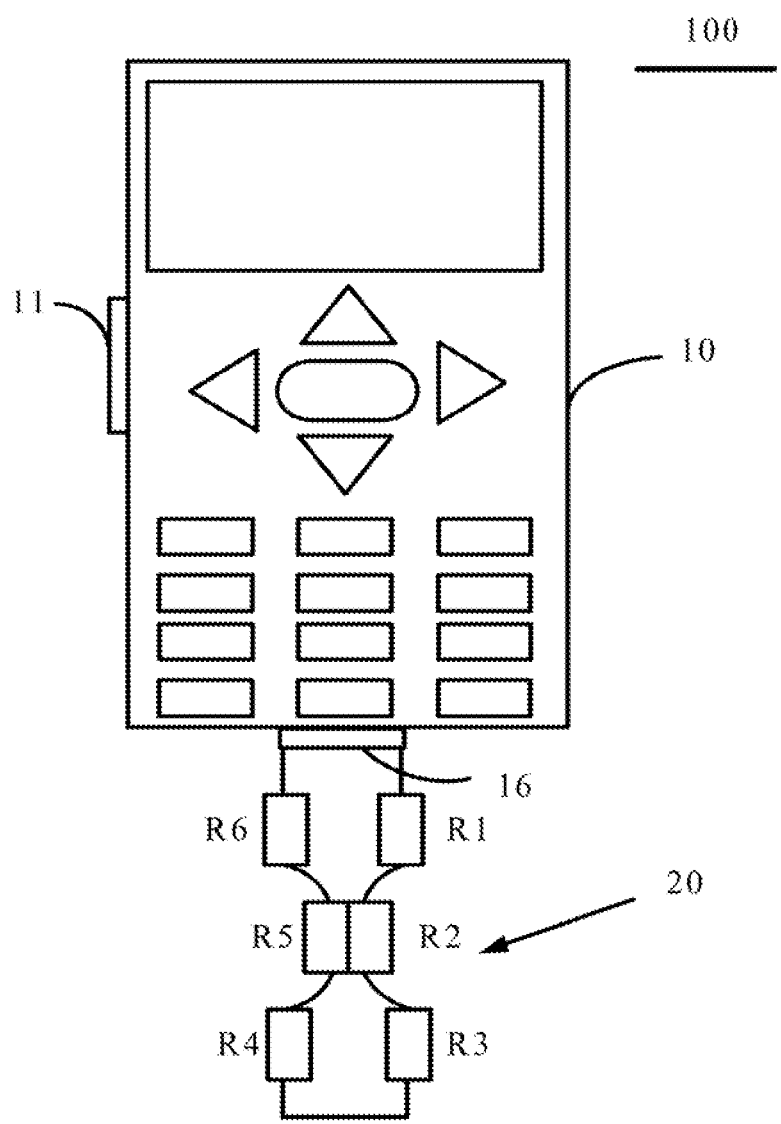
FIG. 4 shows an operation to change the resistance value obtained by a resistance value obtaining module of the system of FIG. 1.

In the embodiment, each resistor of the electronic key 20 is exposed (namely, the resistors R1~R6 are not wrapped by insulated material, for example, each resistor can be a block of metal, such as iron or cuprum, and have no insulated material case), and is connected in series via a conductive line, which is wrapped by insulated material. When different resistors of the electronic key 20 are coupled, the coupled resistors are combined as one resistor, and the resistance value of the electronic key 20 obtained by the resistance value obtaining module 131 is changed accordingly. For example, as shown in FIG. 4, if the user couples the resistor R2 and R5 by his/her fingers, the resistor R2 is contacted to resistor R5 and they are combined as one resistor and cause a short circuit in resistor R3 and R4, and the resistor R1, R2, R5, R6 and the power source 15 forms a circuit. When the power source 15 provides power to the electronic key 20, the current only pass through the resistor R1, R2, R5, and R6, then the resistance value obtained by the resistance value obtaining module 131 is changed to R1 plus R2 plus R5 and plus R6. Therefore, the user can change the resistance value obtained by the resistance value obtaining module 131 by coupling different resistors of the electronic key 20, and thus producing a different unlocking value for the electronic device 10. The unlocking module 133 of the processing unit 13 is also used for controlling the power management unit 14 to switch off the switch S1 after unlocking the electronic device 10, and then the electronic key 20 is deactivated.

Figure 5:
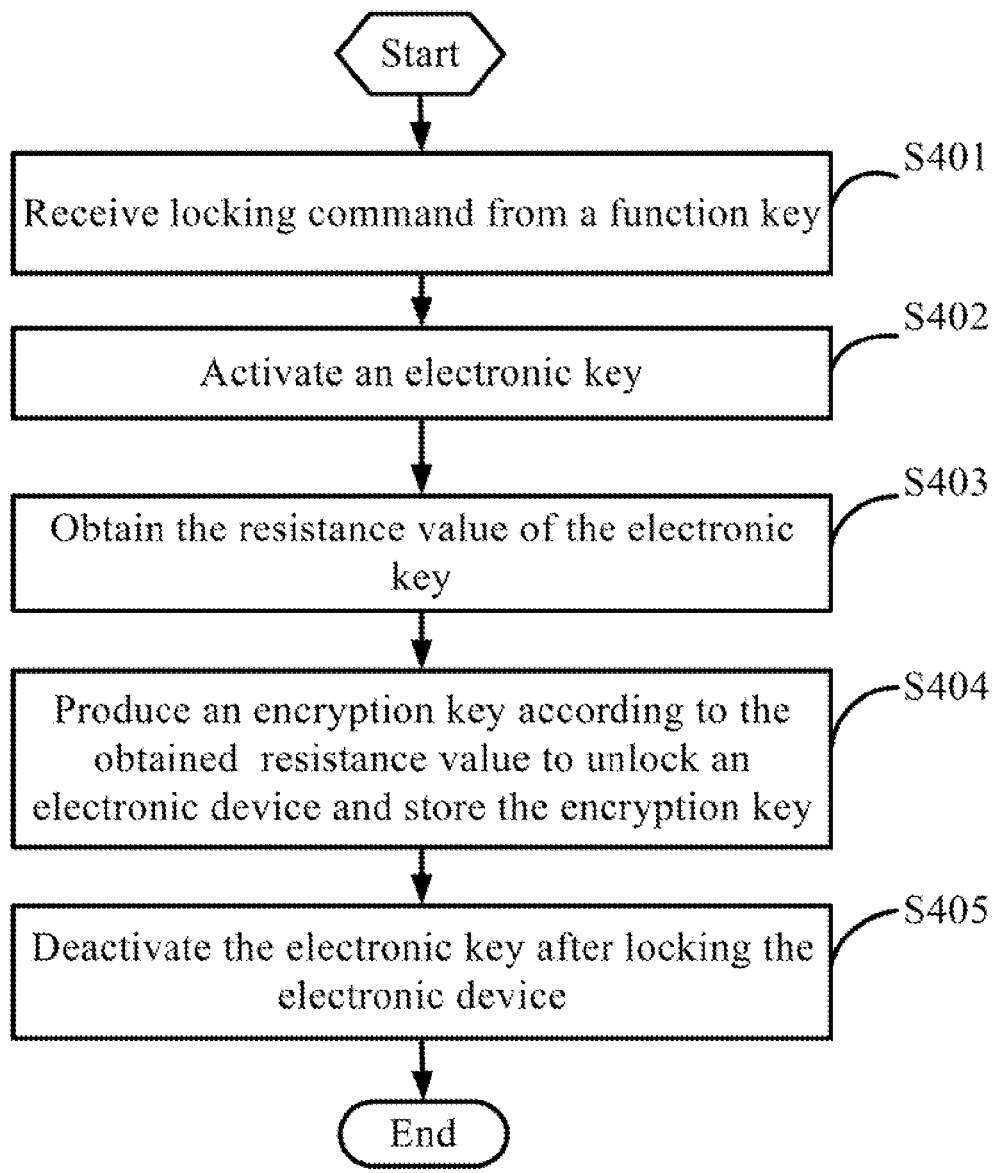
FIG. 5 is flowchart illustrating a method for locking an electronic device of the FIG. 1.

FIG. 5 is flowchart illustrating a method for locking an electronic device, for instance, the electronic device 10. In step S401, the function key 11 produces a locking command in response to user operation.

In step S402, the locking module 132 of the processing unit 13 activates the electronic key 20 when receiving the locking command, namely, the processing unit 13 received the command and controls the power management unit 14 to switch on the switch S1.

In step S403, the resistance value obtaining module 131 obtains the resistance value of the electronic key 20.

In step S404, the locking module 132 produces an unlocking value by encoding the resistance value obtained by the resistance value obtaining module 131 and locks the electronic device 10. In other embodiments, the locking module 132 also prompts the user to input the value again; to ensure the user has set the correct and desired resistance value.

In step S405, the locking module 132 of the processing unit 13 deactivates the electronic key 20 after locking the electronic device 10. The locking module 132 controls the power management unit 14 to switch off the switch S1 after locking the electronic device 10 successfully.

Figure 6:
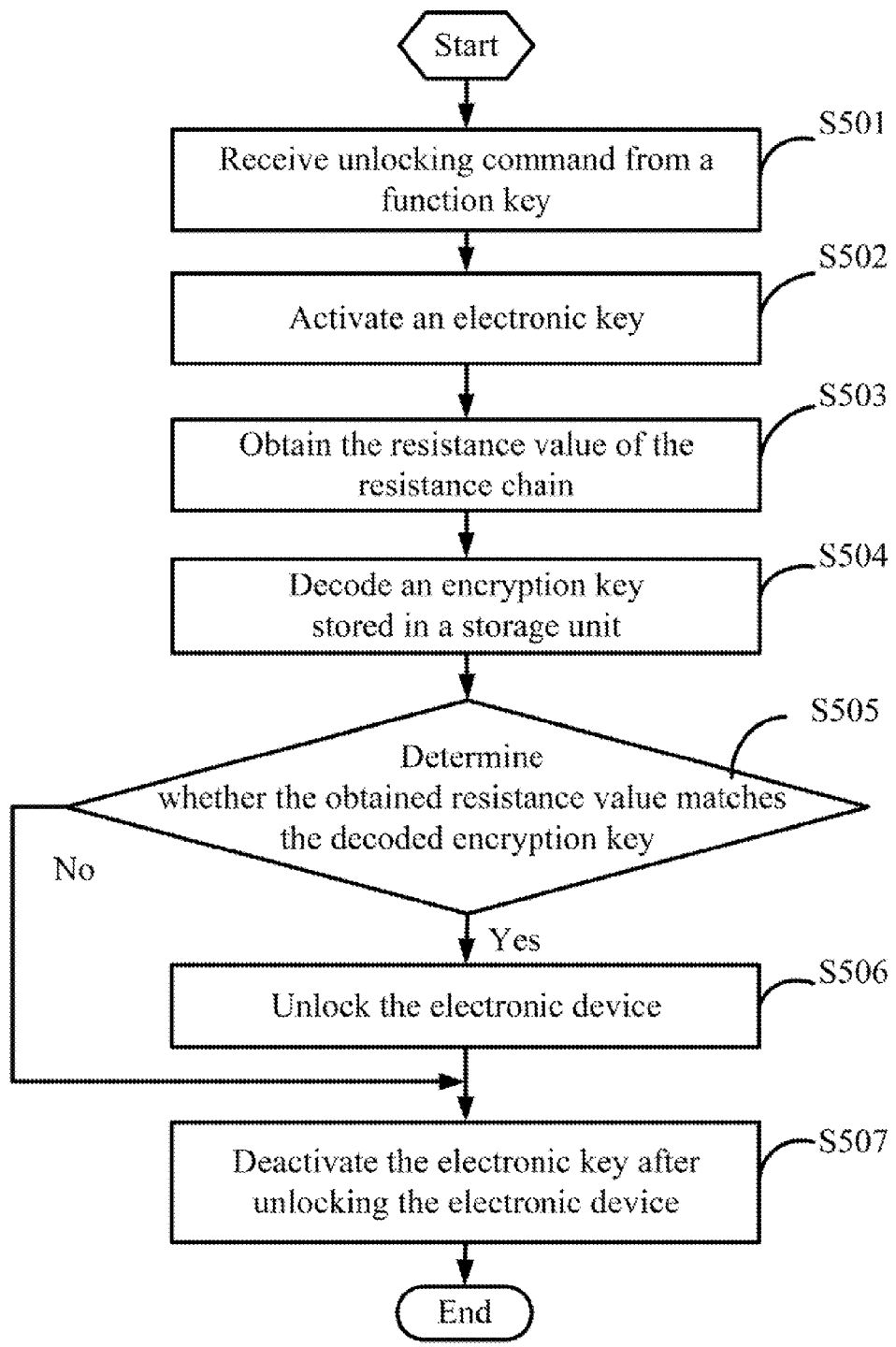
FIG. 6 is a flowchart illustrating a method for unlocking an electronic device of FIG. 1.

FIG. 6 is a flowchart illustrating a method for unlocking an electronic device, for instance, the electronic device 10. In step S501, the function key 11 produces unlocking command in response to user operation.

In step S502, the unlocking module 133 of the processing unit 13 activates the electronic key 20 when receiving the unlocking command, namely the unlocking module 133 of the processing unit 13 controls the power management unit 14 to switch on the switch S1.

In step S503, the resistance value obtaining module 131 obtains the resistance value of the electronic key 20 and transmits the obtained resistance value to the unlocking module 133.

In step S504, the unlocking module 133 decodes the unlocking value stored in the storage unit 12.

In step S505, the unlocking module 133 compares the obtained value with the decoded unlocking value and determines whether the obtained resistance value matches the decoded unlocking value.

If the obtained resistance value doesn't matches the decoded unlocking value, the process goes to step S507, else, in step S506, the unlocking module 133 unlocks the electronic device 10.

In step S507, the unlocking module 133 of the processing unit 13 deactivates switch S1 after unlocking the electronic device 10.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. A system for locking an electronic device, comprising:
an electronic key comprising a plurality of resistors connected in series; and
the electronic device comprising:
   a connection port, configured to connect to the electronic key;
   a storage unit; and
   a processing unit; comprising:
      a resistance value obtaining module configured to obtain a resistance value of the electronic key when connected to the electronic device via the connection port;
      a locking module configured to produce an encryption key by encoding the resistance value obtained by the resistance value obtaining module, and lock the electronic device, the locking module storing the encryption key in the storage unit after locking the electronic device; and
      an unlocking module configured to decode the encryption key stored in the storage unit and compare the decoded encryption key with a resistance value obtained by the resistance value obtaining module, and unlock the electronic device when the obtained resistance value matches the decode encryption key.

2. The system of claim 1, wherein the resistors of the electronic key are exposed and connected to each other via a conductive line, the conductive line is wrapped by insulated material, when different resistors of the encryption key are coupled, the resistance value of the electronic key obtained by the resistance value obtaining module is changed.

3. The system of claim 2, wherein the resistors of the electronic key have a same resistance value.

4. The system of claim 2, wherein the resistors of the electronic key have a different resistance value.

5. The system of claim 1, further comprising a function key configured to produce a locking command or an unlocking command in response to user operations.

6. The system of claim 1, further comprising:
a power source;
a power management unit,
an ammeter; and
a voltmeter;
wherein, the processing unit is further configured to control the power management unit to provide power to the electronic key, the ammeter obtains a current of the electronic key and the voltmeter obtains a voltage of the electronic key, the resistance value obtaining module obtains the resistance value of the electronic key according to the current and the voltage of the electronic key.

7. A method for locking or unlocking an electronic device that comprises:
a connection port, electrically connected to an electronic key, the electronic key comprises a plurality of resistors which are connected in series;
a function key; and
a processing unit,
the method comprising:
receiving a locking command or an unlocking command from the function key;
activating the electronic key when the processing unit receives the locking command and unlocking command;
obtaining a resistance value of the electronic key, producing an encryption key by encoding the obtained resistance value to lock the electronic device when the processing unit receives the locking command from the function key; and decoding the encryption key stored in a storage unit of the electronic device and comparing the decoded encryption key with the resistance value, and unlocking the electronic device if the obtained resistance value matches the decoded encryption key, when the processing unit receives the unlocking command.

8. The method of claim 7, wherein the step of activating the electronic key comprising:

activating the electronic key via a power management unit under the controlling of the processing unit when the processing unit receives the locking command or unlocking command.

9. The method of claim 8, further comprising:

deactivating the electronic key via a power management unit under the controlling of the processing unit after the electronic device has been locked or unlocked by the processing unit.

* * * * *